United States Patent
Hall et al.

[11] 3,857,295
[45] Dec. 31, 1974

[54] TRAPEZIUM POWER TRANSMISSION BELT

[75] Inventors: Donald D. Hall; Leonard J. Confer; James A. Lewis, all of Springfield, Mo.

[73] Assignee: Dayco Corporation, Dayton, Ohio

[22] Filed: May 11, 1973

[21] Appl. No.: 359,575

[52] U.S. Cl. .................................. 74/234, 74/237
[51] Int. Cl. ............................................. F16g 5/00
[58] Field of Search ............ 74/233, 234, 236, 237, 74/230.17 A, 230.17 R, 230.17 B, 230.17 C, 230.17 D, 230.17 M

[56] References Cited
UNITED STATES PATENTS

| | | | |
|---|---|---|---|
| 3,365,967 | 1/1968 | Moogk | 74/230.17 A |
| 3,628,389 | 12/1971 | Wiegelmann | 74/230.17 M |
| 3,656,359 | 4/1972 | Dorf et al. | 74/234 |
| 3,667,308 | 6/1972 | Schwab et al. | 74/237 |
| 3,783,705 | 1/1974 | Moogk | 74/234 |

Primary Examiner—Samuel Scott
Assistant Examiner—Allan R. Burke
Attorney, Agent, or Firm—Reuben Wolk

[57] ABSTRACT

An endless power transmission belt adapted to be operated in a running plane and when viewed in cross section such belt has a pair of oppositely arranged sides wherein one of the sides extends at a greater angle than the other side relative to the running plane, and the belt has a top wall extending between the top edges of the sides and a bottom wall extending between the bottom edges of such sides with at least one of the walls being arranged at an acute angle beneath a plane arranged perpendicular to the running plane and the sides and walls defining a shape which resists and retards the tendency of the belt to distort when running in associated sheaves wherein each has a wide angle sheave side which engages said other side of said belt.

22 Claims, 5 Drawing Figures

PATENTED DEC 31 1974

3,857,295

TRAPEZIUM POWER TRANSMISSION BELT

BACKGROUND OF THE INVENTION

Endless power transmission belts having trapezoidal asymmetric cross-sectional configurations are presently used in various applications; however, it is a well known problem that when operating such presently used belts the natural tendency of each belt is to climb the wider angle side of the sheaves in which it operates whereby its top and bottom walls assume an outward tilt along the wider angle sheave side thereby resulting in a distortion of the entire cross section of the belt and such distortion results in increased belt wear and a reduction in the operating life of the belt.

SUMMARY

This invention provides a simple and economical endless power transmission belt which has a cross-sectional peripheral outline in the shape of a trapezium which tends to distort toward an ideal configuration and thereby provides better performance than presently used asymmetric trapezoidal belts. In particular, the power transmission belt of this invention is adapted to be operated in a running plane and when viewed in cross section such belt has a pair of oppositely arranged sides wherein one of the sides extends at a greater angle than the other side relative to the running plane, and the belt has a top wall extending between the top edges of the sides and a bottom wall extending between the bottom edges of such sides with at least one of the walls being arranged at an acute angle beneath a plane arranged perpendicular to the running plane and the sides and walls defining a shape which resists and retards the tendency of the belt to distort when running in associated sheaves wherein each has a wide angle sheave side which engages said other side of said belt.

Other details, uses, and advantages of this invention will be readily apparent from the embodiments thereof presented in the following specification, claims and drawing.

BRIEF DESCRIPTION OF THE DRAWING

The accompanying drawing shows present preferred embodiments of this invention, in which.

DETAILED DESCRIPTION OF ILLUSTRATED EMBODIMENTS

Figure 1:
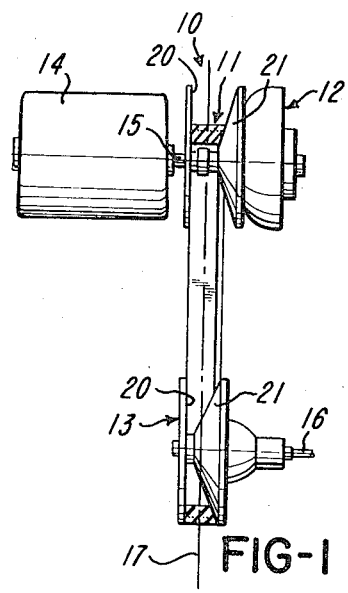
FIG. 1 is a view in elevation illustrating one exemplary embodiment of the endless power transmission belt of this invention operating in driving and driven sheave assemblies of an associated drive and with a portion of the belt broken away so that the position of such belt in associated sheaves may be readily observed.

Reference is now made to FIG. 1 of the drawing which illustrates a variable speed drive which is designated generally by the reference numeral 10 and which is of the type which is designed to use on asymmetric trapezoidal belt and which is shown utilizing one exemplary embodiment of the endless power transmission belt of this invention and such belt is designated generally by the reference numeral 11. The drive 10 is in the form of a variable speed drive and comprises a rotatable driving sheave assembly 12 and a rotatable driven sheave assembly 13 which are operatively connected by the belt 11. The driving sheave assembly 12 may be driven by any suitable prime mover and in this example is shown as being driven by a motor 14 which has a shaft 15 operatively connected to the sheave assembly 12 in any suitable manner known in the art. The driven sheave assembly 13 has a rotatable shaft 16 extending outwardly therefrom which is suitably connected to any device or apparatus which is to be driven by shaft 16.

The belt 11 is particularly adapted to operate in a running plane which in this illustration is shown as a vertical running plane 17; and, in the typical manner of a drive utilizing an asymmetric trapezoidal endless power transmission belt the sheave comprising each of the assemblies 12 and 13 has a narrow angle supporting side or sheave face 20 which may be substantially parallel to the vertical running plane 17 or may diverge outwardly from such running plane by an angle of roughly 6 degrees, for example, and such sheave also has a wide angle supporting side or sheave face 21 which diverges at a substantial angle with respect to the running plane 17. For example, the wide angle sheave face or side 21 may diverge at an angle ranging roughly between 12 and 26 degrees with the vertical plane 17.

Figure 2:
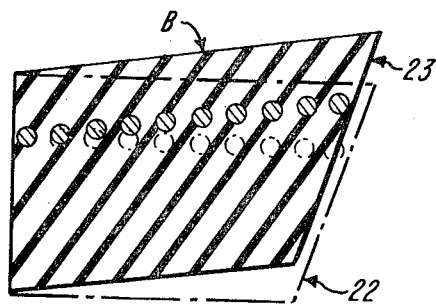
FIG. 2 is a view illustrating a prior art asymmetric trapezoidal belt illustrating the original configuration of such belt with dot-dash lines and illustrating with solid lines the distorted configuration of such belt after extended operation in its associated sheaves.

The problem with asymmetric trapezoidal endless belts in current use having parallel top and bottom walls is highlighted in FIG. 2. In particular, it will be seen that initially a typical prior art asymmetric belt B has the configuration illustrated at 22 by dot-dash lines; however, with extended use of the belt B in an associated drive similar to the drive 10, for example, the belt B becomes distorted due to the tendency of the belt B to climb the wider angle side of the sheaves in which it operates thereby assuming the cross-sectional configuration illustrated by solid lines at 23. This distorted configuration, illustrated at 23, causes accelerated wear and hence accelerated failure of the belt B.

To solve this problem of accelerated wear of an asymmetric substantially trapezoidal belt, the unique belt of this invention (which will be described subsequently) is made so that it has the cross-sectional configuration or outline of a trapezium and when such trapezium distorts it tends to distort to a substantially ideal cross-sectional configuration which results in less wear and a prolonged operating life for the belt.

Figure 3:
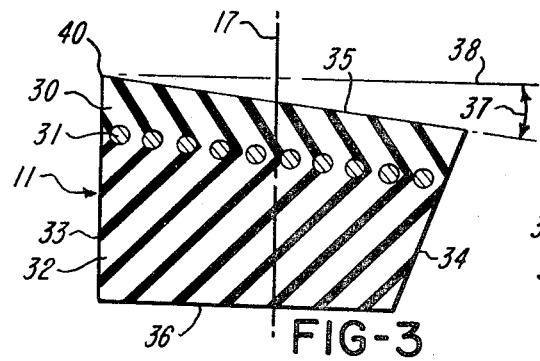
FIG. 3 is an enlarged cross-sectional view of the exemplary belt of FIG. 1 prior to operation of such belt in the drive of FIG. 1.

The belt 11 is illustrated in an enlarged cross-sectional view in FIG. 3 and such belt comprises a tension section 30, a load-carrying section which comprises a spirally wound load-carrying cord 31, and a compression section 32. The belt 11 also has a pair of oppositely arranged walls which will be referred to hereinafter as simply sides 33 and 34 respectively with the side 34 being arranged at a greater angle than the side 33 relative to the running plane 17 in which the belt 11 normally will be operated, and for convenience such plane 17 is shown roughly bisecting the belt 11. Thus, with the belt 11 operating in the sheave assemblies of the variable speed drive 10, the side 34 is arranged at a greater angle than the side 35 with respect to the vertical running plane 17, i.e., the side 34 diverges at a greater included angle from one side of the plane 17 than the included angle that the side 33 diverges from the other side of plane 17.

The belt 11 also has a pair of walls extending between associated edges of the sides 33 and 34 and for easy correlation with the showing of such belt in FIG. 3, such walls will be referred to as a top wall 35 and a bottom wall 36. The top wall 35 extends between the top edges of the sides 33 and 34 and defines the top surface of the tension section 30 and the bottom wall 36 extends between the bottom edges of the sides 33 and 34 and defines the bottom surface of the compression section 32.

The belt 11 has its top wall 35 arranged at an acute angle 37 beneath a plane 38 which extends perpendicular to the running plane 17 while the bottom wall 36 extends substantially parallel to plane 38 whereby in a new or unused belt 11 the intersection of the side 33 and the top wall 35 defines the outermost point of the belt cross section and such point is designated by the reference numeral 40.

As previously mentioned, the belt 11 has a spirally wound load-carrying cord 31 and the properties of such cord are such that each increment along its length or individual coil thereof has substantially the same strength or load-carrying capacity as an adjacent increment or coil. Further, as seen in FIG. 3 the individual coils have centers which are arranged in a rectilinear line which is parallel to the top wall 35.

After extended operation the wide angle side 34 of the belt 10 will have a tendency to ride upwardly or outwardly along its associated sheave side in a similar manner as the prior art belt illustrated in FIG. 2; however, by constructing the belt in the manner illustrated in FIG. 3 such belt tends to move so that its top wall 35 and a line extending through the centers of the coils of the load-carrying cord (viewing the belt in cross section) will be arranged substantially parallel to plane 38 whereby there is less tendency for the belt 11 to wear improperly and hence fail prematurely. Further, it will be appreciated that with movement of the wide angle side 34 of the belt outwardly relative to the other side 33, the top wall 35 approaches a horizontal arrangement so that what originally was the outermost point 40 of the belt now coincides with the top wall 35 which is substantially parallel to the plane 38.

Figure 4:
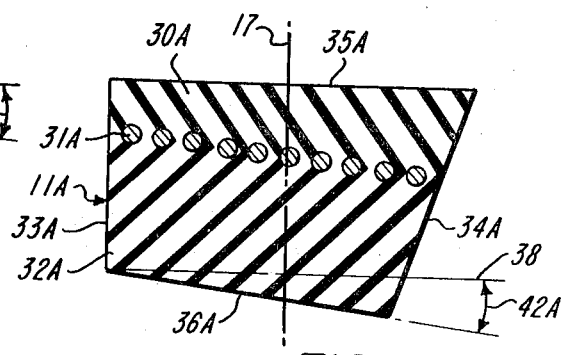
FIG. 4 is a cross-sectional view, similar to FIG. 3, of another exemplary embodiment of the belt of this invention.
Figure 5:
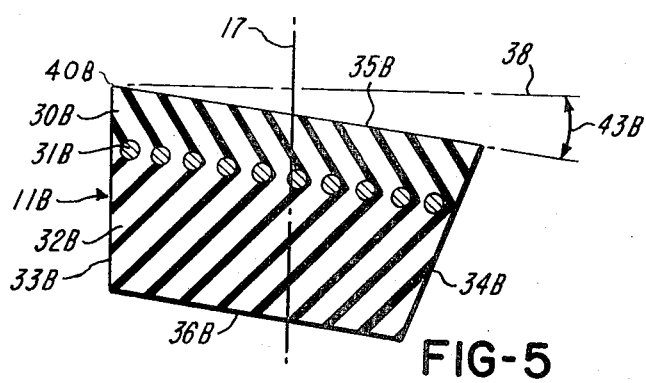
FIG. 5 is a cross-sectional view, similar to FIG. 3, of another exemplary embodiment of the belt of this invention.

Other exemplary embodiments of endless power transmission belts of this invention are illustrated in FIGS. 4 and 5. The belts illustrated in FIGS. 4 and 5 are similar to the belt 11; therefore, such belts will be designated by the reference numerals 11A and 11B respectively and representative parts of each belt which are similar to corresponding parts of the belt 11 will be designated in the drawing by the same reference numerals as in the belt 11 (whether or not such parts are mentioned in the specification) followed by an associated letter designation, either A or B.

The belt 11A is also adapted to be operated in the running plane 17 and when viewed in cross section such belt comprises a tension section 30A, a load-carrying section which comprises of a spirally wound load-carrying cord 31A, and a compression section 32A. As in the case of the belt 11, the belt 11A has oppositely arranged sides 33A and 34A with the side 34A being arranged at a greater angle than the side 33A relative to the running plane 17.

The belt 11A also has a top wall 35A and a bottom wall 36A and the top wall 35A is arranged parallel to the plane 38 which extends perpendicular to the running plane 17 while the bottom wall 36A is arranged at an acute angle 42A beneath the plane 38. Thus, as in the case of the belt 11, the sides 33A and 34A together with the walls 35A and 36A define a shape for the belt 11A which resists and retards the tendency of such belt to distort when running in associated sheaves wherein each sheave has a wide angle sheave side which engages the side 34A of the belt 11A.

The spirally wound load-carrying cord 31A of the belt 11A is wound so that at any cross-section therethrough the centers of the individual coils of cord 31A are arranged on a rectilinear line which is parallel to the inclined bottom wall 36A. With extended operation of the belt 11A the bottom wall 36A and a line through the centers of the individual coils of the load-carrying cord 31A would be arranged substantially parallel to the plane 38 and thus assure efficient operation over a comparatively long service life.

The belt 11B is illustrated in FIG. 5 and is also adapted to be operated in the running plane 17 and when viewed in cross section the belt also comprises a tension section 30B, a load-carrying section comprised of a spirally wound load-carrying cord 31B, and a compression section 32B. The belt 11B has a pair of oppositely arranged sides 33B and 34B with the side 34B being arranged at a greater angle than the side 33B relative to the running plane 17.

The belt 11B also has a top wall 35B extending between the top edges of its sides 33B and 34B with wall 35B defining the top surface of its tension section 30B and has a bottom wall 36B extending between the bottom edges of the sides 33B and 34B and defining the bottom surface of the compression section 32B. In the case of belt 11B each wall 35B and 36B of the belt 11B is arranged at an acute angle beneath a plane 38 which is perpendicular to the running plane 17, and in this example each wall 35B and 36B extends at the same acute angle 43B beneath the plane 38. It will also be seen that in the load-carrying section the individual coils of the load-carrying cord 31B when viewing the belt in cross section have centers which are arranged on a rectilinear line which is parallel to the parallel walls 35B and 36B.

Thus, it is seen that as in the case of the belt 11 the belt 11B also has a point 40B which when the belt 11B is new or unused defines the outermost point of the belt when viewing the belt in cross section in an associated sheave; with continued use of the belt the wide angle side 34B tends to ride outwardly along the wide angle side 21 of its sheaves whereby the plane of the top wall 35B which includes point 40B tends to be moved into a position parallel to the plane 38 which is perpendicular to the running plane 17.

Each belt 11 and 11A rather than being defined in the usual configuration typical of previously proposed asymmetric substantially trapezoidal belts which have a pair of parallel walls adjoined at opposite ends thereof by nonparallel sides has the overall peripheral outline as viewed in cross section of a trapezium wherein the two opposed walls of each pair or set of walls are not parallel. This configuration utilizes the material of the belt, including all of its component portions, to effectively resist and retard the tendency of such a belt to distort when running in associated sheaves of the character mentioned.

In this disclosure of the invention when viewing each belt in cross section the centers of the individual coils comprising the associated load-carrying cord are arranged in a rectilinear line so that in the belt 11 the centers of the individual coils of cord 31 are arranged on a rectilinear line which is parallel to the top wall 35; in the belt 11A the centers of the individual coils of the cord 31A are arranged on a rectilinear line which is parallel to the bottom wall 36A; and in the belt 11B the centers of the individual coils of the cord 31B are arranged on a rectilinear line which is parallel to both walls 35B and 36B. However, it will be appreciated that such centers for each belt 11, 11A, 11B or similar belts may be arranged so that when viewing each new belt in cross section a rectilinear line through associated centers of the coils of a load-carrying cord may extend either perpendicular to the running plane 17 or at any desired angle other than the angles illustrated in the drawing or mentioned in this specification.

Each of the belts 11, 11A, 11B is shown as a so-called raw edge belt, i.e., such belt is shown without a cover on its exposed surfaces; however, it will be appreciated that each of such belts may be provided with a cover made in accordance with any suitable technique known in the art and such a cover may be provided on any one of its walls or sides, on both of its top and bottom walls, on both of its sides, or about the entire periphery thereof. Further, it will be appreciated that such a cover may be a woven fabric cover, or the like, which is impregnated with any suitable elastomeric material which is compatible with the elastomeric material used to make the belt.

Each of the belts 11, 11A, or 11B may have its load-carrying cord 31, 31A, or 31B respectively made of any suitable material such as a polyester, for example, and the cord in each instance may have substantially the same load-carrying capacity throughout its length whereby the individual coils thereof would have substantially the same load-carrying capacity.

Any suitable technique may be employed to make the belt of this invention and preferably such belt (including the embodiments 11, 11A and 11B thereof) is built up in the usual manner using known conventional techniques employed to make asymmetric belts as now in current use. After build up of such a belt a specially designed curing mold, or the like, may be employed to give the associated belt its configuration, such as, the configuration illustrated in FIGS. 3, 4, and 5 for the belts 11, 11A, and 11B respectively.

The angular inclination relative to plane 38 of the top wall, bottom wall, or both the bottom and top walls of a particular belt may vary depending upon the materials used and the application of the belt; however, it has been found that an angle of approximately three degrees gives best results. In the drawing the angle of inclination is exaggerated and shown larger than 3°, for emphasis.

Any suitable material may be used to define each of the belts 11, 11A, and 11B; however, it has been found desirable to define the tension and compression sections of elastomeric material which may be in the form of a natural or a synthetic rubber compound or any suitable synthetic plastic material.

While present exemplary embodiments of this invention, and methods of practicing the same, have been illustrated and described it will be recognized that this invention may be otherwise variously embodied and practiced within the scope of the following claims.

What is claimed is:

1. A power transmission belt adapted to be operated in a running plane and when viewed in cross section said belt comprising, a pair of oppositely arranged sides with one of said sides being arranged at a greater angle than the other side relative to said plane, a top wall extending between the top edges of said sides, and a bottom wall extending between the bottom edges of said sides, at least one of said walls being arranged at an acute angle beneath a plane arranged perpendicular to said running plane, said sides and walls defining a cross-sectional configuration of a trapezium which utilizes the material of the belt to effectively resist and retard the tendency of said belt to distort when running in associated sheaves wherein each sheave has a wide angle sheave side which engages said other side of said belt.

2. A belt as set forth in claim 1 in which said one wall is said top wall.

3. A belt as set forth in claim 1 in which said one wall is said bottom wall.

4. A belt as set forth in claim 1 in which the other of said walls is also arranged at an acute angle to said perpendicular plane.

5. A belt as set forth in claim 1 having, a tension section which has said top wall defining its top surface, a load-carrying section, and a compression section which has said bottom wall defining its bottom surface.

6. A belt as set forth in claim 5 in which said load-carrying section is in the form of a spirally wound load-carrying cord.

7. A belt as set forth in claim 5 in which said load-carrying cord has substantially the same load-carrying properties throughout its length.

8. A power transmission belt adapted to be operated in a running plane and when viewed in cross section said belt comprising, a tension section, a load-carrying section, a compression section, a pair of oppositely arranged sides with one of said sides being arranged at a greater angle than the other side relative to said plane, a top wall extending between the top edges of said sides and defining the top surface of said tension section, and a bottom wall extending between the bottom edges of said sides and defining the bottom surface of said compression section, at least one of said walls being arranged at an acute angle beneath a plane arranged perpendicular to said running plane, said sides and walls defining a shape which resists and retards the tendency of said belt to distort when running in associated sheaves wherein each sheave has a wide angle sheave side which engages said other side of said belt.

9. A belt as set forth in claim 8 in which said one wall is said top wall.

10. A belt as set forth in claim 8 in which said one wall is said bottom wall.

11. A belt as set forth in claim 8 in which the other of said walls is also arranged at an acute angle beneath said perpendicular plane.

12. A belt as set forth in claim 8 in which said tension and compression sections are each made of an elastomeric material and said load-carrying section includes a spirally wound load-carrying cord.

13. A belt as set forth in claim 12 in which said load-carrying cord is in the form of a polyester cord.

14. A belt as set forth in claim 9 in which said load-carrying section is a spirally wound load-carrying cord having individual coils which have centers which when said belt is viewed in cross section are arranged in a rectilinear line parallel to the said top wall.

15. A belt as set forth in claim 10 in which said load-carrying section is a spirally wound load-carrying cord having individual coils which have centers which when said belt is viewed in cross section are arranged in a rectilinear line parallel to said bottom wall.

16. A belt as set forth in claim 11 in which said load-carrying section comprises a spirally wound load-carrying cord having individual coils which have centers which when said belt is viewed in cross section are arranged in a rectilinear line parallel to at least one of said walls.

17. A belt as set forth in claim 11 in which the other of said walls is arranged at the same acute angle beneath said perpendicular plane as said one wall.

18. A belt as set forth in claim 17 in which said load-carrying section is a spirally wound load-carrying cord having individual coils which have centers which when said belt is viewed in cross section are arranged in a rectilinear line parallel to said top and bottom walls.

19. A belt as set forth in claim 8 in which said tension and compression sections are each made of a rubber compound.

20. A belt as set forth in claim 8 in which said tension and compression sections are each made of a plastic material.

21. A belt as set forth in claim 8 in which said one wall is inclined at an acute angle of roughly three degrees beneath said perpendicular plane.

22. A belt as set forth in claim 18 in which said walls are inclined at an acute angle of roughly three degrees beneath said perpendicular plane.

* * * * *